United States Patent

Warren

(10) Patent No.: US 9,513,885 B2
(45) Date of Patent: Dec. 6, 2016

(54) WEB APPLICATION DEVELOPMENT PLATFORM WITH RELATIONSHIP MODELING

(71) Applicant: Peter Warren, Ashland, OR (US)

(72) Inventor: Peter Warren, Ashland, OR (US)

( * ) Notice: Subject to any disclaimer, the term of this patent is extended or adjusted under 35 U.S.C. 154(b) by 0 days.

(21) Appl. No.: 13/973,888

(22) Filed: Aug. 22, 2013

(65) Prior Publication Data

US 2015/0058831 A1  Feb. 26, 2015

(51) Int. Cl.
G06F 9/45 (2006.01)
G06F 17/30 (2006.01)
G06F 9/44 (2006.01)

(52) U.S. Cl.
CPC . *G06F 8/41* (2013.01); *G06F 8/31* (2013.01); *G06F 8/40* (2013.01); *G06F 17/30* (2013.01); *G06F 8/30* (2013.01)

(58) Field of Classification Search
CPC .............................................. G06F 8/30–8/78
See application file for complete search history.

(56) References Cited

U.S. PATENT DOCUMENTS

| | | | |
|---|---|---|---|
| 6,145,119 A | 11/2000 | House | |
| 6,324,682 B1 | 11/2001 | Mccomb | |
| 6,496,870 B1 | 12/2002 | Faustini | |
| 6,792,605 B1 | 9/2004 | Roberts | |
| 6,963,826 B2 | 11/2005 | Hanaman | |
| 6,993,713 B2 | 1/2006 | Wendt | |
| 7,076,766 B2 | 7/2006 | Wirts | |
| 7,080,350 B2 | 7/2006 | Saimi | |
| 7,174,286 B2 | 2/2007 | Martin | |
| 7,302,400 B2 | 11/2007 | Greenstein | |

(Continued)

FOREIGN PATENT DOCUMENTS

| EP | 1139216 A2 | 10/2001 |
|---|---|---|
| EP | 1139216 A3 | 6/2004 |

(Continued)

OTHER PUBLICATIONS

Fraternali, Piero, et al., "Model-Driven Development of Web Applications: The Autoweb System", 2000, pp. 323-382.*

(Continued)

*Primary Examiner* — Thuy Dao
*Assistant Examiner* — Christopher Franco
(74) *Attorney, Agent, or Firm* — Inventive Patent Law P.C.; Jim H. Salter

(57) ABSTRACT

A system and method for dynamically creating web applications from data is described. Simple data is transformed into a declarative application data model that is then parsed by a server and compiled into a functional web application. Application functionality is partly determined by rules applied to web application objects in response to user actions. These rules are triggered by various cues, including user actions and relationships among objects in the web applications. A web application is considered an n-dimensional problem space, and relationships among application objects can be modeled using set theory. The status of a particular relationship among objects and user actions can trigger specific application behavior. Additionally application behavior can be triggered in other ways, like conditions in arbitrary scripts or combinations of multiple triggers combined using logical connectives.

26 Claims, 15 Drawing Sheets

(56) References Cited

U.S. PATENT DOCUMENTS

| | | |
|---|---|---|
| 7,316,003 B1 | 1/2008 | Dulepet |
| 7,349,837 B2 | 3/2008 | Martin |
| 7,363,612 B2 | 4/2008 | Satuloori |
| 7,366,732 B2 | 4/2008 | Creeth |
| 7,421,450 B1 | 9/2008 | Mazzarella |
| 7,434,163 B2 | 10/2008 | Mckellar |
| 7,444,585 B2 | 10/2008 | Mckellar |
| 7,496,843 B1 | 2/2009 | Russell |
| 7,519,970 B2 | 4/2009 | Jones |
| 7,546,576 B2 | 6/2009 | Egli |
| 7,627,579 B2 | 12/2009 | Joines |
| 7,653,545 B1 | 1/2010 | Starkie |
| 7,669,137 B2 | 2/2010 | Chafe |
| 7,669,183 B2 | 2/2010 | Bowman |
| 7,739,657 B2 | 6/2010 | Rolfs |
| 7,774,697 B2 | 8/2010 | Olander |
| 7,774,751 B2 | 8/2010 | Zhuk |
| 7,788,122 B2 | 8/2010 | Greenstein |
| 7,788,647 B2 | 8/2010 | Martin |
| 7,831,543 B2 | 11/2010 | Milstead |
| 7,861,158 B2 | 12/2010 | Martin |
| 7,861,213 B2 | 12/2010 | Wang |
| 7,870,286 B1 | 1/2011 | England |
| 7,895,050 B2 | 2/2011 | Greenstein |
| 7,904,304 B2 | 3/2011 | Greenstein |
| 7,917,363 B2 | 3/2011 | Starkie |
| 7,934,191 B2 | 4/2011 | Yassin |
| 7,941,321 B2 | 5/2011 | Greenstein |
| 8,069,435 B1 | 11/2011 | Lai |
| 8,099,787 B2 | 1/2012 | Vasudeva |
| 8,103,641 B2 | 1/2012 | Baskaran |
| 8,103,953 B2 | 1/2012 | Mckellar |
| 8,141,032 B2 | 3/2012 | Joo |
| 8,332,807 B2 | 12/2012 | Finlayson |
| 8,332,864 B2 | 12/2012 | Bose |
| 8,375,370 B2 | 2/2013 | Chaar |
| 8,418,126 B2 | 4/2013 | Chaar |
| 8,418,131 B2* | 4/2013 | Emmelmann ............... 717/111 |
| 8,458,612 B2 | 6/2013 | Chatterjee |
| 2001/0047402 A1 | 11/2001 | Saimi |
| 2002/0049788 A1 | 4/2002 | Lipkin |
| 2002/0156789 A1 | 10/2002 | Creeth |
| 2003/0014442 A1 | 1/2003 | Shiigi |
| 2003/0084120 A1 | 5/2003 | Egli |
| 2003/0167456 A1 | 9/2003 | Sabharwal |
| 2003/0233631 A1 | 12/2003 | Curry |
| 2004/0046789 A1 | 3/2004 | Inanoria |
| 2004/0098704 A1* | 5/2004 | Becker et al. ............... 717/115 |
| 2004/0111672 A1 | 6/2004 | Bowman |
| 2004/0111704 A1 | 6/2004 | Kim |
| 2004/0216044 A1 | 10/2004 | Martin |
| 2004/0216045 A1 | 10/2004 | Martin |
| 2004/0221256 A1 | 11/2004 | Martin |
| 2004/0221260 A1 | 11/2004 | Martin |
| 2005/0022116 A1 | 1/2005 | Bowman |
| 2005/0065756 A1 | 3/2005 | Hanaman |
| 2005/0240863 A1 | 10/2005 | Olander |
| 2005/0273772 A1* | 12/2005 | Matsakis et al. ............ 717/136 |
| 2006/0064573 A1 | 3/2006 | Rolfs |
| 2006/0294500 A1* | 12/2006 | Chiang ................... G06F 8/30 |
| | | 717/109 |
| 2007/0033569 A1* | 2/2007 | Davidson et al. ........... 717/103 |
| 2007/0100844 A1 | 5/2007 | Buttner |
| 2007/0168931 A1 | 7/2007 | Martin |
| 2007/0203679 A1 | 8/2007 | Macura |
| 2008/0127217 A1 | 5/2008 | Wang |
| 2008/0201653 A1* | 8/2008 | Khandekar ................. 715/765 |
| 2008/0228853 A1 | 9/2008 | Brinck |
| 2008/0263179 A1 | 10/2008 | Buttner |
| 2009/0049553 A1 | 2/2009 | Vasudeva |
| 2009/0055749 A1 | 2/2009 | Chatterjee |
| 2009/0083726 A1* | 3/2009 | Amend et al. ............... 717/171 |
| 2009/0089618 A1 | 4/2009 | Rajan |
| 2009/0125878 A1* | 5/2009 | Cullum ................... G06F 8/51 |
| | | 717/106 |
| 2009/0228838 A1 | 9/2009 | Ryan |
| 2010/0235829 A1* | 9/2010 | Shukla et al. ............... 717/177 |
| 2011/0078556 A1* | 3/2011 | Prasad ..................... G06F 8/10 |
| | | 715/234 |
| 2011/0145296 A1* | 6/2011 | Ellison et al. ............... 707/800 |
| 2011/0191407 A1 | 8/2011 | Fu |
| 2012/0030653 A1* | 2/2012 | Porras et al. ............... 717/124 |
| 2012/0066178 A1* | 3/2012 | Omansky ............ G06F 17/5004 |
| | | 707/626 |
| 2012/0096070 A1 | 4/2012 | Bryzak |
| 2012/0166616 A1 | 6/2012 | Meehan |
| 2012/0185911 A1 | 7/2012 | Polite |
| 2012/0204162 A1* | 8/2012 | Nikara ................ G06F 9/45516 |
| | | 717/148 |
| 2012/0324428 A1 | 12/2012 | Ryan |
| 2013/0132289 A1* | 5/2013 | Agnew .................. G06Q 50/16 |
| | | 705/313 |
| 2013/0132422 A1* | 5/2013 | Rogish ............... G06F 17/3089 |
| | | 707/769 |
| 2013/0247030 A1* | 9/2013 | Kay ......................... G06F 8/60 |
| | | 717/178 |
| 2014/0019847 A1* | 1/2014 | Osmak ............... G06F 17/2247 |
| | | 715/234 |
| 2014/0035945 A1* | 2/2014 | Anglin et al. ............... 345/619 |
| 2014/0040879 A1* | 2/2014 | Goldman ................. G06F 8/61 |
| | | 717/175 |
| 2014/0282464 A1* | 9/2014 | El-Gillani ................... 717/168 |

FOREIGN PATENT DOCUMENTS

| | | |
|---|---|---|
| EP | 1727041 A2 | 11/2006 |
| EP | 1727045 A2 | 11/2006 |
| EP | 2287723 A2 | 2/2011 |
| EP | 2290531 A2 | 3/2011 |
| EP | 2290532 A2 | 3/2011 |
| WO | WO/01/52090 A2 | 7/2001 |
| WO | WO/02/093364 A2 | 11/2002 |
| WO | WO/03/009177 A1 | 1/2003 |
| WO | WO/03/010684 A1 | 2/2003 |
| WO | WO/2004/019160 A2 | 3/2004 |
| WO | WO/2005/038667 A1 | 4/2005 |
| WO | WO/2007/057854 A2 | 5/2007 |
| WO | WO/2007/057854 A3 | 5/2007 |
| WO | WO/2009/018277 A1 | 2/2009 |
| WO | WO/2009/023715 A1 | 2/2009 |
| WO | WO/2004/077258 A2 | 9/2010 |
| WO | WO/2011/091388 A2 | 7/2011 |

OTHER PUBLICATIONS

Koch, Nora, et al., "Model-Driven Generation of Web Applications in UWE." 2007, pp. 1-17.*

Manolescu, Ioana, et al., "Model-Driven Design and Deployment of Service-Enabled Web Applications", 2005, pp. 439-479.*

Brambilla, Marco, et al., "Declarative Specification of Web Applications exploiting Web Services and Workflows", 2004, pp. 1-2.*

Kurtev, Ivan, et al., "Building Adaptable and Reusable XML Applications with Model Transformations", 2005, pp. 160-169.*

Leff, Avraham, et al., "WebRB: A Different Way to Write Web Applications", 2008, pp. 52-61.*

* cited by examiner

Set Operations

Position Sets

Set A Includes Set B/Is Superset      Set A Included in Set B/Is Subset

Set A Intersects Set B      Union of Set A & Set B is Empty

WEB APPLICATION DEVELOPMENT PLATFORM WITH RELATIONSHIP MODELING

TECHNICAL FIELD

This patent application relates to computer-implemented software and networked systems, according to one embodiment, and more specifically to a system and method for web application development with relationship modeling.

BACKGROUND

With the maturation of web technology, more functionality is being delivered to users via web applications that run inside browsers. A web application can be any piece of functionality that executes in a browser. Applications that once ran as locally-installed software on a desktop computer are now often accessed remotely from the cloud (remotely hosted internet services) via a web browser. Applications like Gmail and Google Docs are perfect examples. Instead of using an installed email client, people use a web browser to access their email. Instead of locally-installed spreadsheet or word processing software, people use a web browser to access Google Docs to create spreadsheets and word documents online.

The web applications, sometimes called Rich Internet Applications (RIA), often leverage web technologies like JavaScript, JavaScript libraries (like jQuery), Ajax, HTML5, CSS3, and others to provide a graphically-rich, responsive interface for a user via a web browser. Web applications can be simple as well and be composed of more standard HTML, CSS, and JavaScript.

As more and more software is delivered via the web, the need for tools to enable easy creation of web applications has grown. One tool developed to meet this need is the Google Web Toolkit (GWT). The GWT is a Java to JavaScript compilation tool that leverages professional Java development and debugging tools to facilitate development of web applications. It also helps alleviate cross-browser compatibility issues and performs optimizations on the compiled JavaScript. Basically, GWT is a tool for more easily writing JavaScript applications using custom code. GWT requires developers to write Java code that is compiled into Javascript GWT is essentially a Java to JavaScript compiler and is broadly applicable for creating many kinds of web applications. GWT is not a declarative application modeling language and has no declarative mechanism for managing rules and relationships among objects and dynamically updating the user interface in response to user actions and selections. GWT also does not transform basic xml data into application data that can be parsed on a server and delivered to users as a fully-functional web application. In other words, GWT is a tool that helps facilitate the creation of JavaScript applications, but GWT does not offer the novel elements of the embodiments described and claimed herein.

Many HTML and CSS frameworks have also been constructed to help ease the burden of creating web sites and web applications. These frameworks are building blocks for web development and facilitate building an invention like the one described here. However, like GWT, these frameworks are not specifically designed to rapidly build and update the type of rules-based applications described herein. Specifically the frameworks do not provide a declarative application modeling language with support for roles that dynamically manage the web application interface based on a user's selections.

Additionally, a particular class of applications that depend on managing complex product relationships and intricate internal logic, often called configurators, has conventionally been delivered as client/server applications where the logic is executed on the server. The client/server interaction introduces latency and processing delays because the client has to send a request to the server for every action taken on the client and then wait for the response from the server.

SUMMARY OF THE INVENTION

The various embodiments of this invention provide an application development platform for creating, deploying, and updating web applications. The embodiments take advantage of advances in client-side/browser functionality to deliver applications that run primarily on the client, which improves responsiveness and performance.

The platform of an example embodiment uses a declarative application language to describe web application data and functionality. Using a declarative language simplifies application creation and maintenance.

Functionality that falls outside the bounds of the declarative application language can be provided via custom code. The example embodiment offers hooks for external code to be triggered based on events in the web application, and also provides an Application Programming Interface (API) that external code can use to interact with the web application.

The declarative application data is compiled into ready-to-serve web application content that can be cached and delivered to user browsers reliably and scalably. Using pre-compiled, cached content minimizes server load by only compiling the web application once, when the application is deployed to the server, and not compiling the application every time it is requested by a user. Pre-compiling the content results in minimal server processing to service requests and also enables use of caches and global content delivery networks.

Simple, base data is transformed into declarative application data before being deployed to the platform server. The intermediate transformation process provides several of advantages:
  It keeps base data simple and shields application managers from any data complexity they do not need access to.
  It allows validation/error-checking on base data in the exact format the application manager is comfortable with.
  It allows data and transformations to be reused and repurposed to leverage existing resources and improve development efficiency.

Some of the options for data and transformation reuse include:
  Using multiple base datasets with a single transformation to create multiple web applications.
  Using a single base dataset with multiple transformations to create multiple web applications.
  Datasets and transformations can be mixed and matched in many ways to maximize reuse of existing assets. Datasets and transformations can also be dynamically/automatically created and invoked to generate web applications without any manual intervention.

Embedding web applications into client web pages is primarily performed by the platform server, which makes embedding very simple for a client. A client simply inserts a token into their host page and provides the URL of their host page to the platform. The platform server manages retrieving the host page, embedding the web application into the host page, and delivering the resulting complete web page.

The web application can also be integrated with various third party systems, like e-commerce platforms, via custom scripts that are included in the embedding process.

To enable web applications wish complex product compatibilities and intricate business logic, the described example embodiment supports several mechanisms for specifying and enforcing relationships among application objects, including: position-based relationships, script-based relationships, and Boolean combinations of relationships (grouping relationships via logical operators like "and", "or", "not", etc.). These relationships are structured to trigger appropriate actions (application behavior) in response to user selections, gestures, or behavior.

An action in combination with an action trigger can be considered a rule. Rules can be specified to perform certain actions under certain conditions. These actions can include: showing and hiding application objects, selecting and deselecting application, objects, showing message dialogs, adjusting the application UI (e.g. changing a product view or moving to a new selection area), etc.

A key feature of the described example embodiment is the maintenance of application state in a state identifier (which can easily be expressed in a URL—a "stateful URL"). Web applications are not dependent on sequential application of operations in order to arrive at the correct state. A web application can accurately parse and represent its current state from the data contained in a single URL. Using stateful URLs of course does not prevent the system from using other state representation techniques, State identifiers enable state caching, transmission of state information among web applications, and social/sharing functionality

BRIEF DESCRIPTION OF THE DRAWINGS

The various embodiments are illustrated by way of example, and not by way of limitation, in the figures of the accompanying drawings in which.

DETAILED DESCRIPTION

Figure 1:
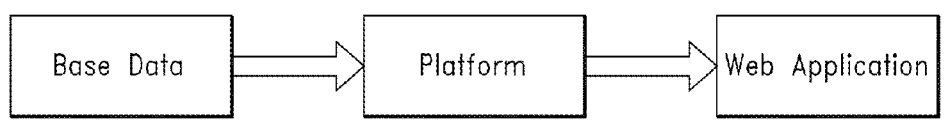
FIG. 1 illustrates a conceptual overview of how data gets converted into a functional web application.

In the following description, for purposes of explanation, numerous specific details are set forth in order to provide a thorough understanding of the various embodiments. It will be evident, however, to one of ordinary skill in the art that the various embodiments may be practiced without these specific details.

In the various embodiments described herein, a system and method for web application development with relationship modeling are disclosed. The various embodiments provide a system and method for dynamically creating web applications from data. The described example embodiment capitalizes on the improved processing power of client computers and improved web technologies to provide a solution that is easier to build and update and is more flexible and more responsive than previous approaches. Simple data is transformed into a declarative application language that is then parsed by a server and compiled into a functional web application. Data from any source can be aggregated into a simple structured dataset. This simple structured dataset is then processed to transform it into a declarative application format. This application data is then compiled into the HTML, JavaScript, and web components needed to deliver a fully-functional web application to a requesting browser. The application is responsive to user actions and dynamically updates its interface as a user interacts with the application. The user interface updates are based on: user actions, directives contained in the declarative application language, and relationships among objects specified via the modeling systems described.

DEFINITIONS

Application Client (also Client)—a person, group or entity that uses the described web application platform to provide web applications for their users. Not to be confused with "client" when used in the context of client/server computing architecture.

Application Data—Data that conforms to the schema defined by the application data language. Application data is data that is ready to be compiled into a web application by a server.

Application Developer (also Developer)—a person, group or entity that uses the described web application development platform to create web applications on behalf of an Application Client.

Application Manager (also Manager)—a person, group or entity that uses the described web application development platform to manage and maintain web applications on behalf of an Application Client.

Application Web Page—the complete HTML page that includes the Host HTML Page as well as the embedded web application and all resources required by the web application.

Base Data—simple, structured data that is transformed into Application Data.

Host HTML Page—the HTML into which a web application will be embedded.

Resources—Any files, code, data, information used by the platform to enable its functioning.

Web Application—A set of web resources that, when combined with a Host HTML Page, provide the desired web functionality.

Description of an Example Embodiment of the Declarative Application Language

A declarative web application language simplifies application development by allowing web application developers to create applications by defining what the applications do, not how they do it. Similar to creating an HTML web page, the declarative web application language lets developers build applications by specifying the data and behavior of a web application using declarative tags. A completely custom web application can be created without any custom coding at all.

A declarative application file could be as simple as:

```
<application>
    <app_id>
        <client_id>clientA</client_id>
        <model_id>modelA</client_id>
    </app_id>
    <flow><question_pool /></flow>
    <ui>
        <basic_ui>
    </ui>
</application>
```

This application simply serves as a shell into which other applications can be nested. What is important is that there is no code involved, just a simple, declarative model of the application. The same declarative approach can be used to create far more elaborate applications. An example of a more complex application is shown below in Appendix A.

Customization

The platform of an example embodiment also offers many hooks triggered by events in the application so that any functionality not provided by the existing language tag set can be created with custom code. The platform also provides a JavaScript API accessible to external JavaScript.

Pre-Compilation

When application data files are sent to the platform server, the server parses the declarative data and compiles it into serialised, optimized web applications that are ready to be embedded into client web pages and served to user browsers. Because the user interaction with the application is all managed on the browser, the server only needs to provide the browser with static web application content. The platform server does not need to manage state, sessions, cookies, or deliver any dynamic application content.

Using static, pre-compiled resources allows the platform to run with minimal server load. Additionally utilizing static, pre-compiled resources allows the platform to leverage proxy caches and content delivery networks for high scalability and resiliency.

Data Transformations

Overview

Base data is transformed into declarative application data before being uploaded or deployed to the platform server. Using a data transformation to transform simple, base data into the declarative application language offers ease-of-use and flexibility. The base data can be formatted to a particular client's needs and nomenclature. It can contain only the data that a client wants to manage. All of the other declarative application tags/elements can be hidden inside the data transformation. The client, can be shielded from any complicated, confusing, or unneeded information. Providing a client-specific data format offers ease-of-use for the client by eliminating any unnecessary information from, the base data and by tailoring the names of the data elements to exactly what the client is comfortable with. Offering the client a simple data format containing only client-relevant information means clients can more quickly and easily manage their data and business logic. It also means that business managers and domain experts can update their own web applications as business logic changes, and the need for IT middlemen is eliminated, resulting in huge cost savings.

The base data can be assembled from any source, or even multiple sources. It can be pulled from spreadsheets, databases, flat files, entered manually, etc. The base data is a collection of data that is in a format that a data transformation can correctly process. Base datasets have schema that define their structure. A schema can be unique for a particular dataset, or one schema can be more general and applicable to many datasets.

FIG. 1 highlights a simple overview of the transformation process. Base Data is pulled into the Platform and transformed and compiled into a Web Application.

Figure 2:
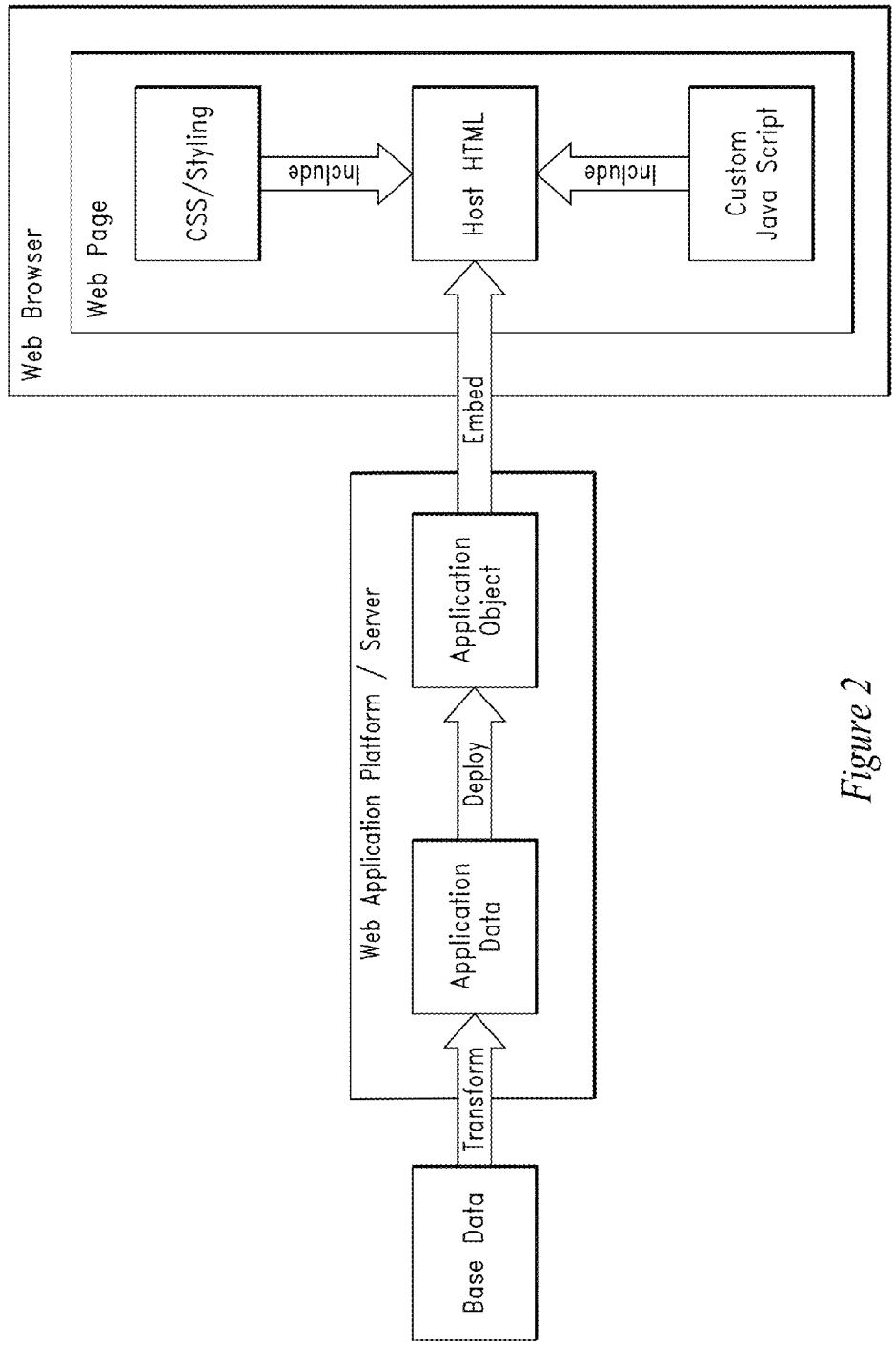
FIG. 2 illustrates a more detailed overview of the components and process involved in creating a web application from data.

FIG. 2 shows a detailed view of the process in FIG. 1. Base Data is pulled into the Web Application Platform where it is transformed into Application Data. The Application Data is then deployed and compiled into a web Application Object. On request from a Browser, the web Application Object is embedded into the Host HTML and delivered to the requesting Browser. The requesting Browser retrieves all referenced resources and loads the Web Page, which includes fetching all related page resources, like CSS and JavaScript, and initializing the Application Object.

In one embodiment of the invention, the base data is described in Extensible Markup Language (XML) and linked with XML Schema Definition (XSD) files to provide validation tools to application managers and developers. Validation tools make it easier for managers and developers to manage data. The base data is then transformed into application data using Extensible Stylesheet Language (XSL) tools.

This base data is transformed into the application data language understood by the platform server. Converting base data into a fully-functional web application ready for delivery to browsers is called "deploying". The act of deploying is automated and can be triggered by a client or web application developer with a single click of a button on a web page or a single call to the platform web service. Deploying new web applications can be automated or scheduled as well.

Figure 3:
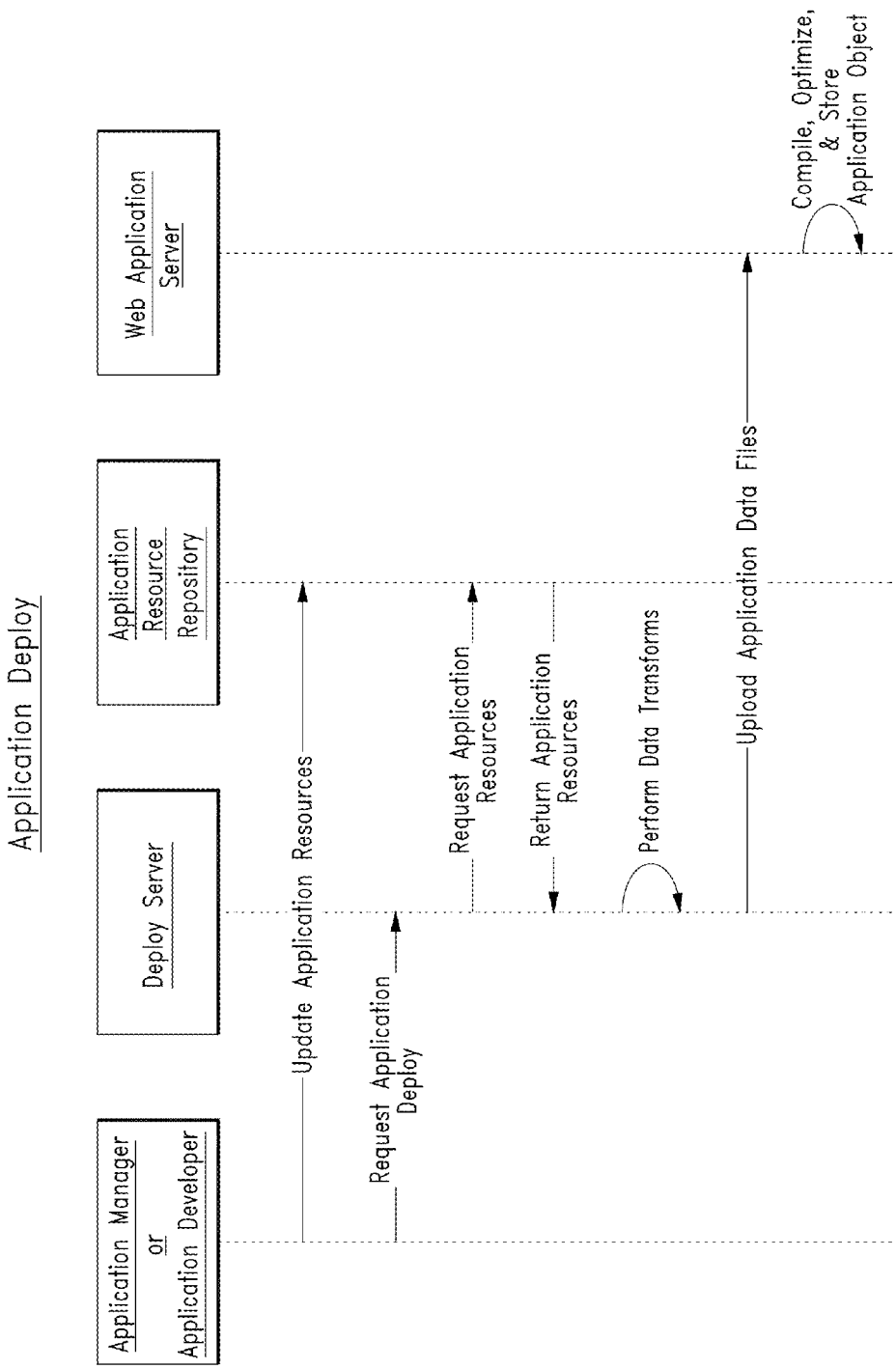
FIG. 3 illustrates how an application manager can update the application data and deploy those changes to the web application server.

FIG. 3 depicts the deployment process. An Application Manager or Developer first updates the Application Resources by making changes to the base data or transforms. Then the manager sends a request to the Deploy Server to trigger the deployment process. The Deploy Server fetches the updated Application Resources and executes the data transformation, which results in new Application Data files. These Application Data files are uploaded to the Web Application Server where they are compiled, optimized, and stored as Web Application Objects, ready for embedding into a web page.

Transformation Options

The mechanism of transforming base data into application data enables data and transformations to be mixed and matched in various ways to provide for reuse and repurposing of existing data and transformations.

Single Dataset/Multiple Transformations

For example, a single base dataset can be transformed in multiple ways to create multiple, different web applications. A use case might be a product manufacturer who wants to use the same data to create a web application for internal employees and a web application for external resellers. The same data can be used with two different transformations to create the two separate applications. Being able to reuse the single dataset means an application manager only needs to manage data in a single place, which is more efficient and eliminates data synchronization problems.

A single dataset can also be used with multiple transformations to create multiple applications based on the same data to use for A/B testing. Clients can then test multiple versions of an application to determine which functionality is more effective.

A dataset can also be channeled through multiple separate transformations (a transformation pipeline) to arrive at the final application data file. In other words base data can be transformed by transform 1; the output of transform 1 is transformed by transform 2; the output of transform 2 is transformed by transform 3; the output of transform 3 is the application data. Any number of transformations can occur between the base data and the resultant application data.

Figure 4:
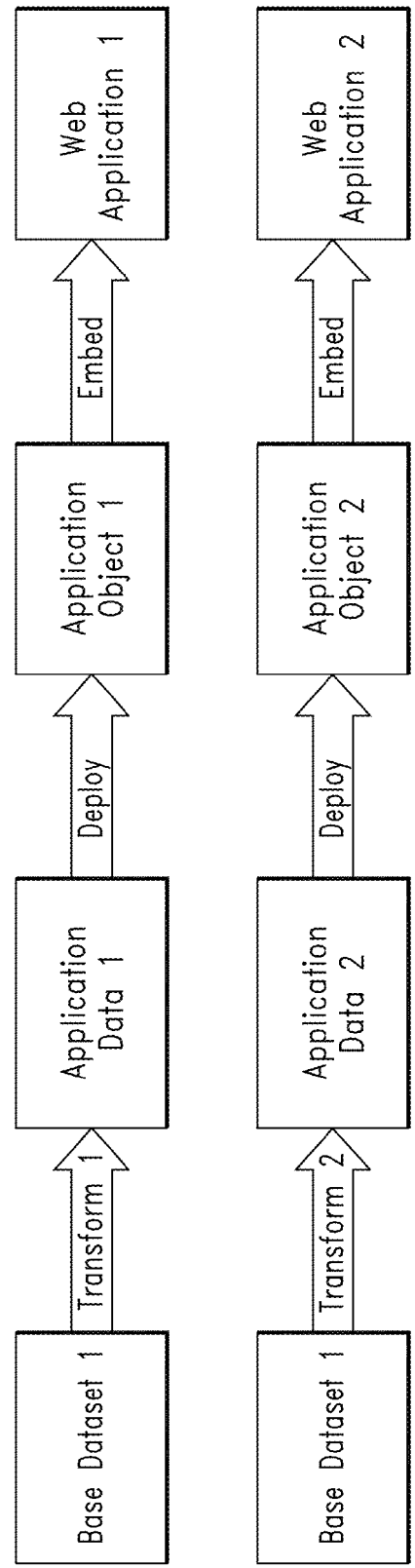
FIG. 4 illustrates how a single dataset can be run through different transforms to yield different web applications.

FIG. 4 diagrams the process of transforming a single dataset into multiple applications.

Base Dataset 1 is transformed, via Transform 1 to yield Application Data 1. Application Data 1 is then, deployed and embedded to produce Web Application 1.

Base Dataset 1 is transformed via Transform 2 to yield Application Data 2. Application Data 2 is then deployed and embedded to produce Web Application 2.

Multiple Datasets/Single Transformation

Another example is using multiple datasets with a single transformation. In this way, multiple web applications can be created that exhibit common functionality but use different underlying data. A use case might be a retailer who wants to offer a product line with many products, for example a furniture maker who sells couches and chairs. The retailer would like end users to be able to view separate web applications for each of the products, couches and chairs. Since the application functionality is common to both applications, the retailer would like to re-use the same functionality for both applications (i.e. both applications show images of the product and allow users to select fabrics and trim pillows, etc.). To do so, the retailer would like to create the two datasets, one for each product, and have a single transformation generate the two different applications. The single transformation would turn the base data for couches and the base data for chairs into two separate web applications that behave similarly but present the end user with different options that reflect the different underlying datasets.

Figure 5:
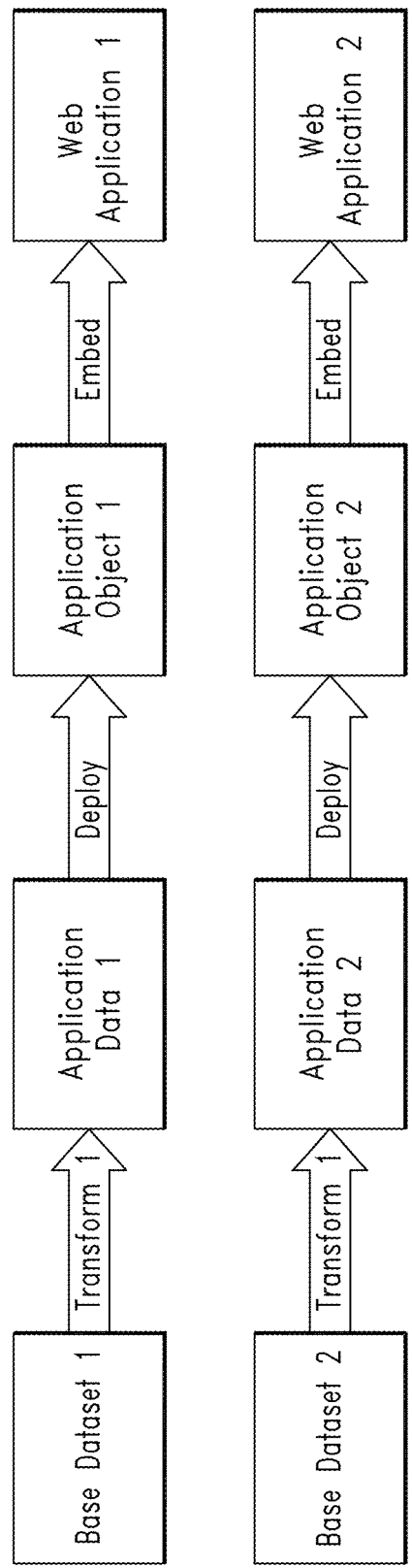
FIG. 5 illustrates how multiple datasets can be run through a single transform to yield different web applications.

FIG. 5 diagrams the transformation of multiple datasets into multiple applications via a single transform.

Base Dataset 1 is transformed via Transform 1 to yield Application Data 1, Application Data 1 is then deployed and embedded to produce Web Application 1.

Base Dataset 2 is transformed via Transform 1 to yield Application Data 2. Application Data 2 is then deployed and embedded to produce Web Application 2.

Automatic Applications

Creation of a web application using the described platform is done by uploading declarative application data to the platform server. How this application data is generated is irrelevant to the server. The application data can be generated manually, via a data transformation pipeline, or generated via a scheduled automated process that dynamically creates application data files without any manual intervention.

Simple Embedding/Integration

The technique utilized by the described web application platform enables simple integration with client web sites and provides flexibility in allowing web applications to be repurposed for use in multiple web pages, even with different behavior defined by each web page. Conventionally, embedding external web applications into a web page (or "host page", the page into which the web application gets embedded) requires that JavaScript or HTML tags be added directly to the web page. This approach introduces the potential for error in adding the required elements and also introduces a maintenance burden if the external application provider needs to update code or tags. Often the external application provider requests that all users of their system make manual updates to the host pages using their applications, which is obviously a hassle for both the application provider and its users.

Rather than require clients to insert custom JavaScript or tags into their host pages, this example embodiment moves the onus of integration almost completely to the platform, which simplifies client integration and removes the maintenance burden from clients. All clients have to do to embed a web application into a web page is add a simple HTML tag to their host page at the location where the web application should be embedded.

For example, in the sample host html page below the "<!—app.embed—>" tag tells the platform server where to embed the web application:

```
<html>
    <body>
        Embed application here:
        <!-- app.embed -->
    </body>
</html>
```

Figure 6:
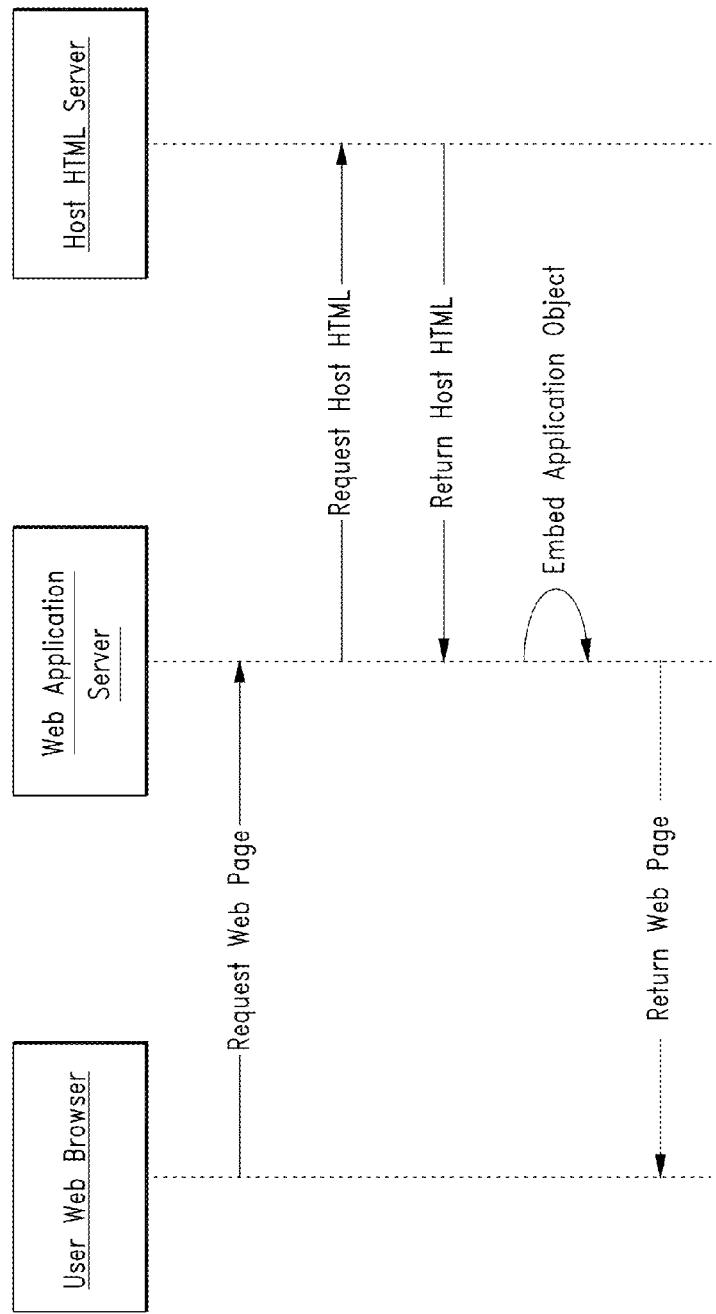
FIG. 6 illustrates the sequence of steps involved in embedding a web application into a client host HTML page.

A key to this process is delivering the web application directly from the web application platform and not from, the client web site. As shown in FIG. 6, to deliver a complete web application a Browser requests a particular Web Page from the Web Application Server. The Server then:

fetches the client Host HTML from the client Host HTML Server, embeds the web Application Object into the Host HTML, including adding any necessary scripts, tags, css, etc. required for proper functioning of the web application, delivers the complete Application Web Page to the requesting browser.

This finalized application web page can be cached to eliminate the need to fetch the client host page and re-create the application web page on every web application request.

Cookies and HTTP request headers can be forwarded along to the client host html server when fetching the client host HTML page.

Additionally the URL of the web page can be masked via reverse proxy, custom subdomains, or alternative techniques to make the URL match that of the client web site or domain. Reverse proxy is a mechanism for delivering content from a remote server via an intermediate server so that the content appears as if it originated from the intermediate server.

This approach enables very simple embedding for the client, but also offers flexibility in reusing the same web application in multiple web pages. A complete application web page includes the host HTML, the web application, and can also include different CSS for styling, different scripts for different functionality, different back-end integration, like connecting with different e-commerce systems, etc. A complete application web page contains all information that is used in displaying and executing a web application in a client browser.

Figure 7:
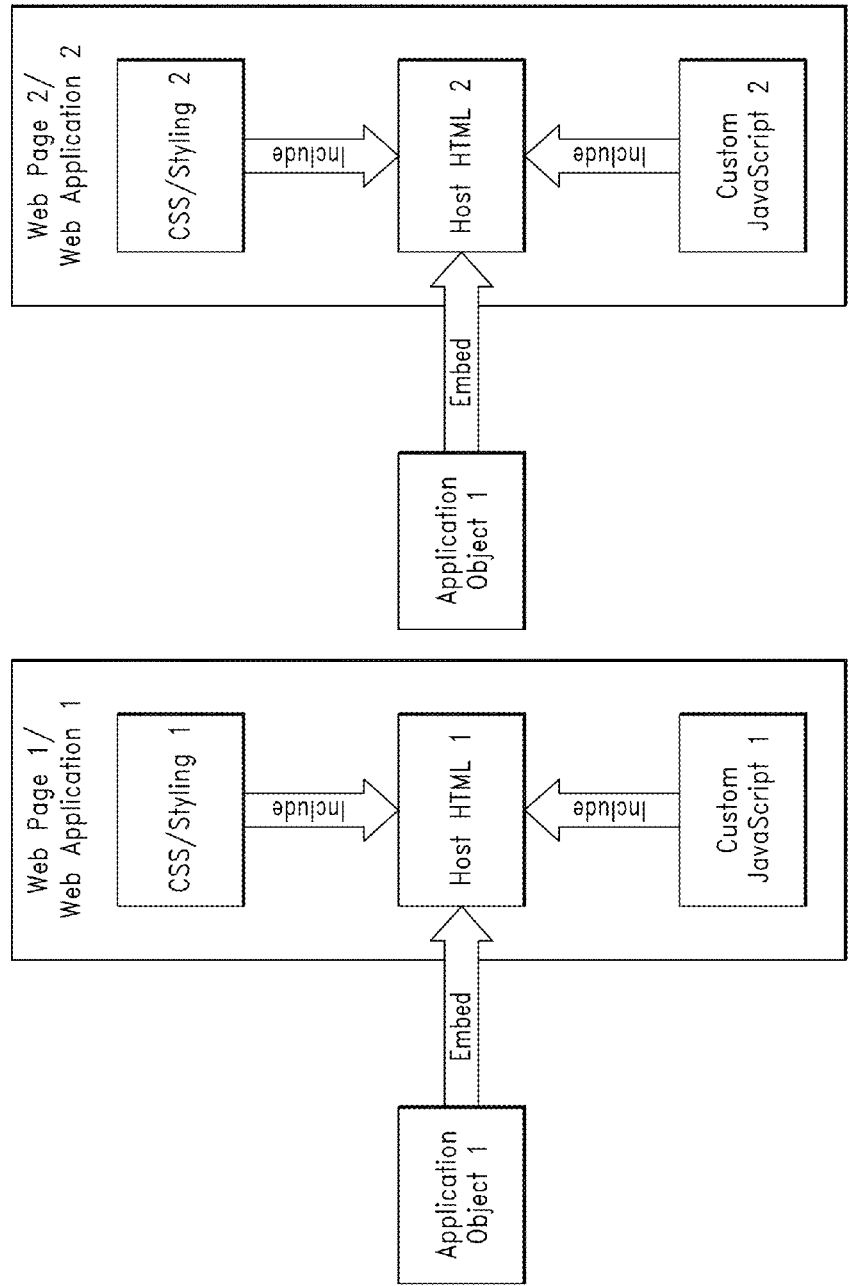
FIG. 7 illustrates how a single web application can be embedded into multiple host HTML pages.

As shown in FIG. 7, a single web application can be embedded in multiple web pages to yield multiple web applications with potentially different behavior, styling, integration with third party systems, etc. In FIG. 7, Application Object 1 is embedded into Host HTML 1. Host HTML 1 includes specific styling information, CSS 1, and specific functionality via Custom JavaScript 1. When combined, with the Application Object the resulting Web Application 1 has styling and functionality defined by CSS 1 and Custom JavaScript 1. This example with CSS and JavaScript is simply illustrative; other web resources can be included in the web page to affect the behavior of the web application. Also Custom JavaScript 1 can include multiple JavaScript files from various sources.

FIG. 7 also shows Application Object 1 embedded into different host HTML. Host HTML 2. Host HTML 2 uses different resources, CSS 2 and Custom JavaScript 2, to apply different styling and behavior to Application Object 1, resulting in an entirely different web application, Web Application 2.

Web Page 1 and Web Page 2 can use the same application object to fulfill various needs. The key benefit is the ability to reuse and repurpose existing data and application functionality, which saves time and minimizes data maintenance problems.

For example a product manufacturer might have a main web site with a web application for direct access by customers. The manufacturer might have resellers who also want to offer customers the ability to interact with the same web application on the reseller web site. The embedding technique described above allows a single web application to be embedded in both the manufacturer main site and the reseller site, each with different styling and connections to different e-commerce systems.

Another key element of this approach is ease of maintenance. Any changes to the embedding approach can be done once in a centralized location on the web application platform server and disseminated globally and instantly to all web applications on the platform. The need for a change might occur if the application platform changes its preferred social/sharing or analytics code or any other change affecting how an application is embedded into host HTML. If the embedding were managed on the clients' servers, any changes would need to be propagated, separately to each client's host page and would entail a large manual updating effort.

Integration with third party systems, like e-commerce or CRM software, can also be managed via the web context (or application web page), which consists of the host HTML page, the embedded web application, and all included web resources. A web application can leverage integration scripts or functionality provided in its web context to communicate with, third, party systems. This approach also allows a single web application, when used in multiple contexts, to Integrate with different third party systems. For example the same web application can be used in a manufacturer web page as well as that manufacturer's reseller's web pages, and can integrate with different e-commerce systems in each case.

Relationship Modeling

Applications that manage complex product compatibilities and complicated internal logic have a special need to be able to model relationships among application elements in a simple, easy-to-manage format. Applications with such, needs include: configuration, troubleshooting, diagnostics, bundling, guided selling, data navigation, sales quote generation, expertise automation, recommendation engines, customization/design, personalization, etc., basically any application that provides logical direction or guidance to a user based on user selections.

Such applications continually evolve as the underlying business logic changes. Maybe new parts or products are introduced, fabrication rules change, retailer discounts are updated. Being able to accommodate the continually evolving business logic that forms the foundation of these applications is critical. Web applications built with this example embodiment will be updated regularly and often by people without any specialized, technical knowledge. The platform provides a simple. Intuitive approach that lets even non-technical users manage and update their application business logic.

Additionally this web application development platform needs to accommodate applications as varied as custom bike saddle builders to data center configurators, wine pairing recommendation tools to online event planners. The relationship modeling system needs to manage relationships for a wide spectrum of applications and functionality.

To provide the required simplicity and flexibility, this example embodiment offers several mechanisms for modeling the business logic that underlies web applications.

User Selections

As a user interacts with a web application, the user's actions are recorded as "selections". These selections can be used to update the application state based on internal logic specified in the web application. User selections can be treated as a position (or positions) and used in position-based modeling described below. User selections can also be exposed to custom scripts for use in script-based modeling, also described below.

Rules/Action Triggers

To reflect the business logic specified by clients in the underlying data and transformations, the platform provides a mechanism to update the state of the web application based on user selections and user behavior. The application state can be updated via actions. Actions can be triggered based on events or input that occur in the web application. An action is any behavior necessary to provide the desired web application functionality. Actions can include: showing or hiding application objects, selecting or deselecting application objects, showing a message dialog, or any other application behavior.

These actions can be triggered in a number of different ways, outlined below. The combination of a given action with a given action trigger can be considered a "rule". Rules can have explicit or implicit action targets. An action target is the application object that is the recipient of the behavior specified by a given action.

For example, a rule could declaratively be specified as follows:

```
<rule>
    <action><select /></action>
```

```
<trigger>
    <on_update>
        <match>
            <object_id>objectA</object_id>
        </match>
    </on_update >
</trigger>
<targets>
    <object_id>objectB</object_id>
</targets>
</rule>
```

This rule indicates that objectB (defined as the target of the rule) should be selected (defined in the rule action) if when the application updates its state (defined in the trigger), objectA is included in the user's selections (objectA "matches" the user's selections via the default "is included" set comparison—more on set comparisons below). The example embodiment accommodates rule chaining, where the action triggered in one rule can in turn trigger another action, which in turn triggers another, etc.

Position-Based

Position-based relationship modeling derives from the insight that all elements/objects in a web application can be construed as comprising an n-dimensional problem space. Each object in a web application is a position within a dimension. Dimensions can be nested hierarchically and infinitely. At the top level a web application can be considered a dimension as well as a position (a location inside its own dimension). Inside the application can be any number of other dimensions and positions, including nested web applications, which are themselves dimensions within their parent dimension (application). Within this framework, any set of objects inside a web application can be considered a position and compared against any other set of objects (also a position) using set theory.

Figure 8:
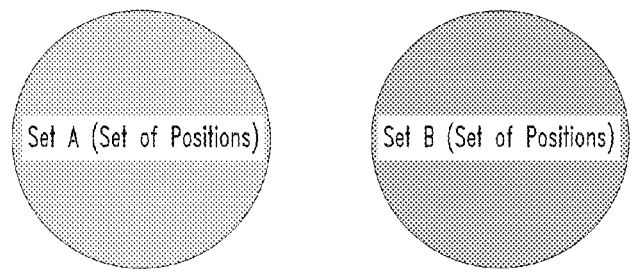
FIG. 8 illustrates an overview of position-based set operations used in relationship modeling.
Figure 8:
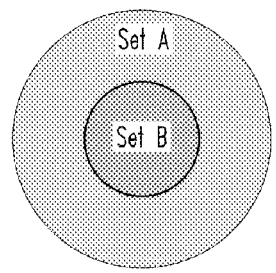
Figure 8:
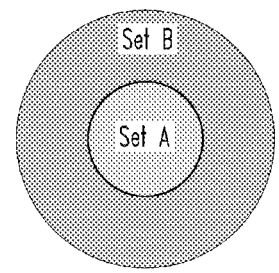
Figure 8:
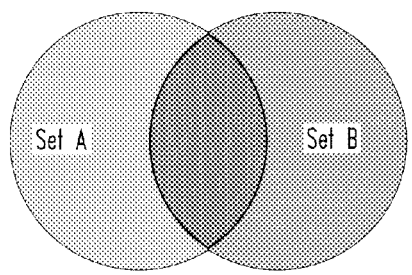
Figure 8:
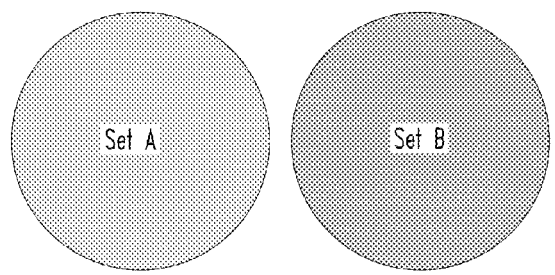

FIG. 8 reviews some of the set operations utilized by the system: includes, is included, intersects, union.

Figure 9:
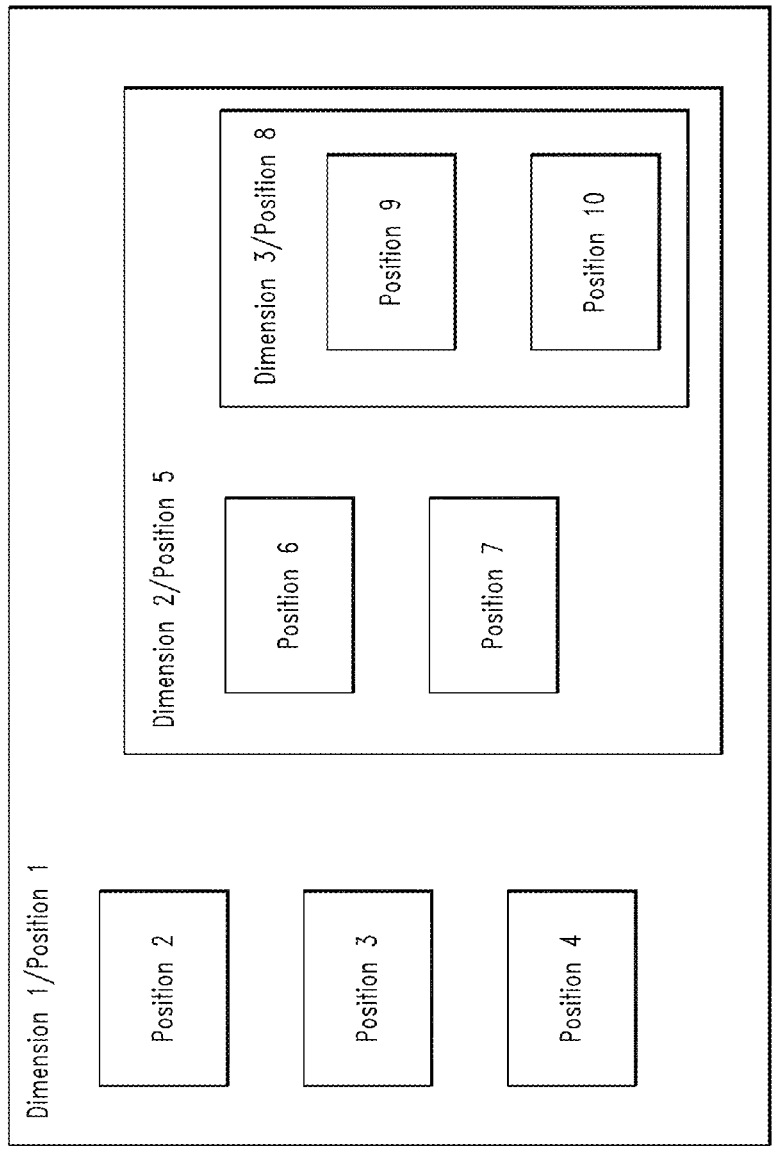
FIG. 9 illustrates an abstract, conceptual example for understanding position-based relationship modeling.

FIG. 9 provides an abstract overview of this problem space. Dimension 1 is a global dimension which contains all the positions for a given application, Dimension 1 is also a position, Position 1. Position 1 could be nested into a higher dimension. Beneath Dimension 1 are a series of positions, Position 2-4, which are located directly underneath the Dimension 1 dimension. Dimension 1 also contains Dimension 2, which is itself a position, Position 5. Underneath Dimension 2 are two positions. Position 6-7. Dimension 2 also contains another dimension, Dimension 3, which is a position as well, Position 8. Dimension 3 contains two other positions. Positions 9-10.

Using this framework, relationships among application objects can be established using simple set theory operators like includes, intersects, union, etc. Based on the configuration in FIG. 9, the following questions can be answered. Does Dimension 1 include the set of Position 3 and Position 4? Yes. Does the set of Position 3 and Position 9 Intersect with Position 10? No, is the set of Position 9 and Position 10 included in Position 5? Yes.

Figure 10:
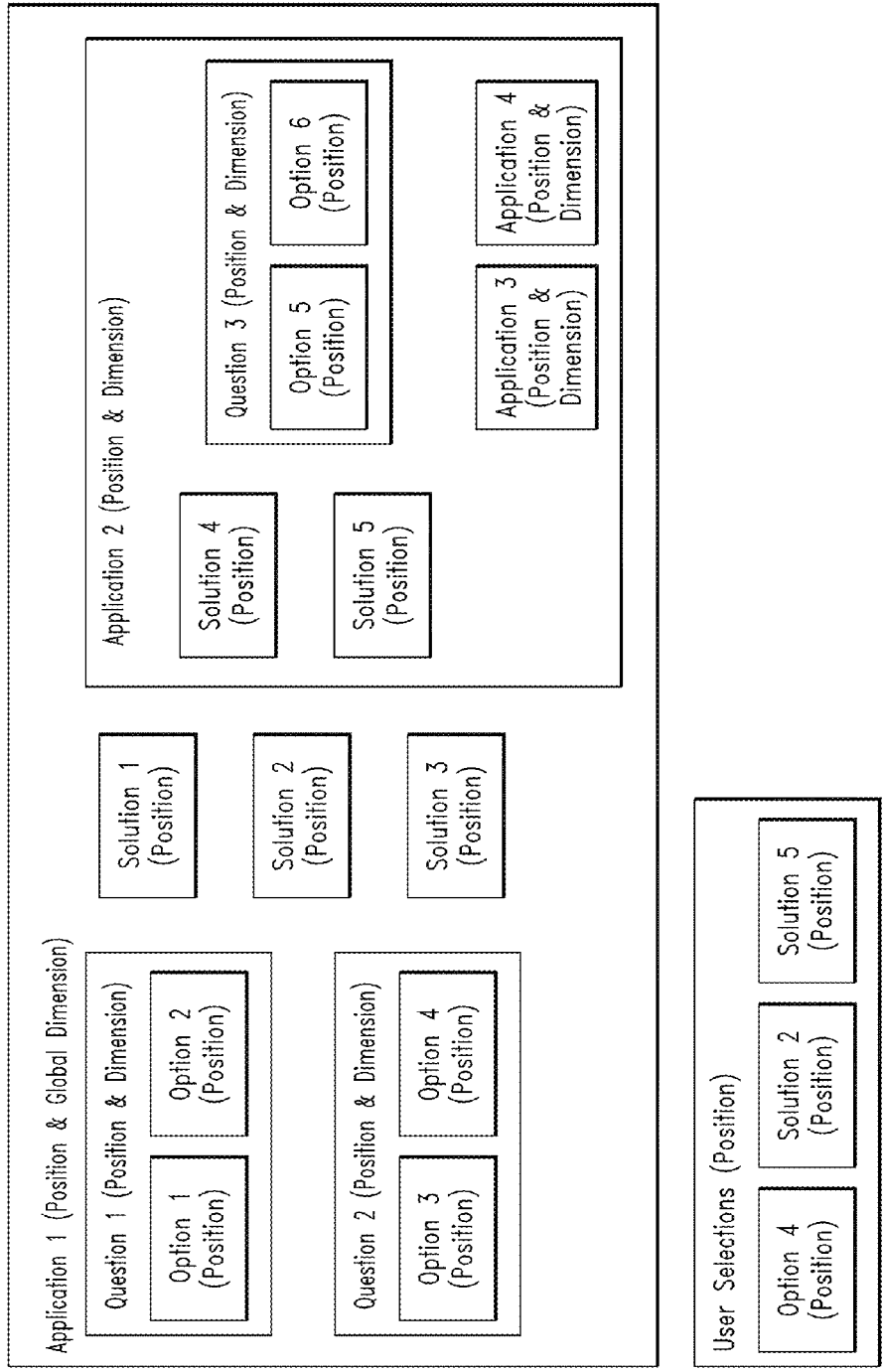
FIG. 10 illustrates a concrete example for understanding position-based relationship modeling.

FIG. 10 provides a concrete example of this position-based framework. Application 1 is the global application which is both a position and the global dimension that contains all other dimensions in that application. Application 1 contains questions, options, solutions, and a nested application. Application 2, which itself contains questions, options, solutions, and nested applications. Questions and applications are both positions and dimensions. Options and solutions are just positions as they do not contain any sub-positions.

FIG. 10 also shows user selections, which are the objects that a user has selected via interaction, with the user interface of the browser. User selections can be represented as a position (or positions) and used for comparison purposes. In this case, a user has selected Option 4, Solution 2 and Solution 5. This position, the set of objects comprised of Option 4, Solution 2 and Solution 5 can be compared using set theory against other sets of positions. For example the set of Solution 2 does not include the set of objects in User Selections. However the set of User Selections does include Solution 2. Also the set of Solution 2 intersects with the set of User Selections. Additionally the set of Option 2, Option 3, and Option 4 intersects with the set of User Selections.

These position-based comparisons can be used to trigger specific behaviors in a web application.

For example to express a product compatibility rule, an application developer might specify that a given product option (option B) should only be available to the user if another given option (option A) has already been selected. Such a rule can be expressed by saying option B should only be visible if option A has been selected by the user. The trigger for this rule could be a position-based rule that states: "if the user selections include option A, then, show option B".

Such a rule could be written declaratively like this:

```
<option>
    <option_id>A</option_id>
</option>
<option>
    <option_id>B</option_id>
    <match>
        <option_id_ref>A</option_id_ref>
    </match>
</option>
```

The above rule is effectively saying "show option B if the set of user selections includes the set of option A". The action triggers can be evaluated in any order and are activated based on a set comparison with the current application state. Triggered rules that change application state can cause the set of rules to be re-evaluated for further triggers. Such an approach accommodates rule chaining as described above.

In code, application objects can be treated as positions by having the application objects provide a specific set of functionality. In Java, this functionality can be described as an Interface that might look like the code below.

```
public interface Position extends Serializable, Comparable<Position> {
    public boolean includes(Position otherPosition);
    public boolean includes(Position otherPosition, Dimension
        dimension);
    public boolean isIncludedIn(Position otherPosition);
    public boolean intersects(Position otherPosition);
    public Position getPosition(Dimension dimension);
    public boolean matches(Position otherPosition);
    ...
}
```

Script-Based

The example embodiment also provides another method for relationship modeling: script-based relationship modeling. An action trigger can be specified as arbitrary custom code. When the action trigger is being evaluated, the custom code is executed and returns a value indicating whether or not the action should be triggered. Allowing arbitrary code to determine relationships provides unlimited flexibility in what conditions trigger an action. Application objects can also be marked with arbitrary custom attributes that can be used in script-based relationship evaluation. These custom attributes can be used to enforce attribute-based constraints and provide flags for any other processing. User selections can be retrieved via an API which allows script-based modeling against the user selections or against attributes or characteristics of the user selections.

Using an example similar to the position-based one above, a script-based rule could be written like this:

```
<option>
    <option_id>A</option_id>
    <attribute>
        <name>attr</name>
        <value>11</value>
    </attribute>
</option>
<option>
    <option_id>B</option_id>
    <attribute>
        <name>attr</name>
        <value>9</value>
    </attribute>
</option>
<option>
    <option_id>C</option_id>
    <script_match>
    <![CDATA[return selections_api.getAttributeValue('attr') < 10;]]>
    </script_match>
</option>
```

In this example, the script trigger for option C will be triggered when the user's selected option has an attribute value of less than 10. In other words, the script trigger will be triggered when the user has selected option B but will not be triggered when the user has selected option A. This example assumes that options A and B are mutually exclusive (i.e. cannot be selected at the same time). Setting up a rule for mutual exclusion is a capability of the described rule system as well.

More practically, the example above could be applied in a case where a user is selecting computer hardware components that each has a certain amount of memory. A rule could be specified to show new options to the user in the case where the user's selected amount of memory exceeds a certain threshold. Alternatively a ride could be specified to eliminate certain options if the total memory associated with the user's selections exceeds a certain threshold.

Another example is creating a rule to automatically select a given option if a sum total of the user's current selections exceed a certain amount.

Or an application developer might want to use custom logic, based on interaction with external data, to determine whether a certain product option is in stock or sold out and not show to the user any products that are out of stock.

Combinations

Position-based and script-based triggers can be combined via Boolean operators; and, or, not, etc. The Boolean operators allow logical evaluation of multiple action triggers to provide a single result value. The Boolean expressions can be nested. For example:

(trigger A) or (trigger B and (trigger C or trigger D))

Downloading/Data Partitioning

Just-in-Time Downloading

Application functionality can be spread across multiple nested or linked sub-applications. Sub-applications are not downloaded by the executing web application until they might be needed. In other words, web applications will download any sub-applications that are immediate children but not any sub-applications further down the descendant path. For example if Application 1 contains Application 2 which contains Application 3, upon initialization Application 1 will download Application 2, but will not download Application 3. Only if/when Application 2 is actually invoked will Application 3 be downloaded. Using such an approach makes the system very responsive, only pulling down data that a user is likely to use.

Figure 11:
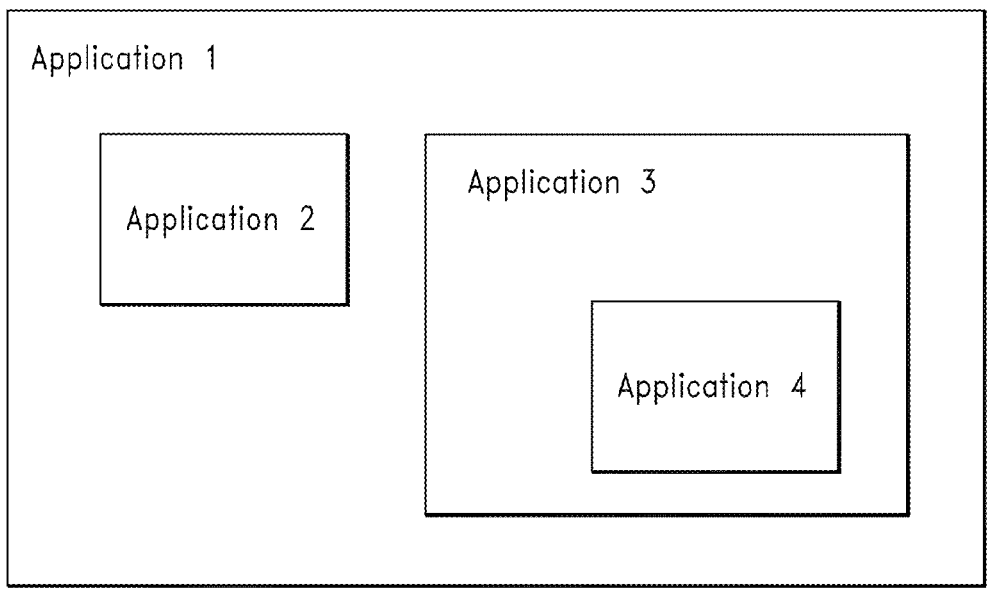
FIG. 11 illustrates an application nesting example used in the example shown in FIG. 12.

FIG. 11 shows an example of an application nesting configuration. Application 1 has nested applications. Application 2 and Application 3, Application 3 has its own nested application, Application 4.

Figure 12:
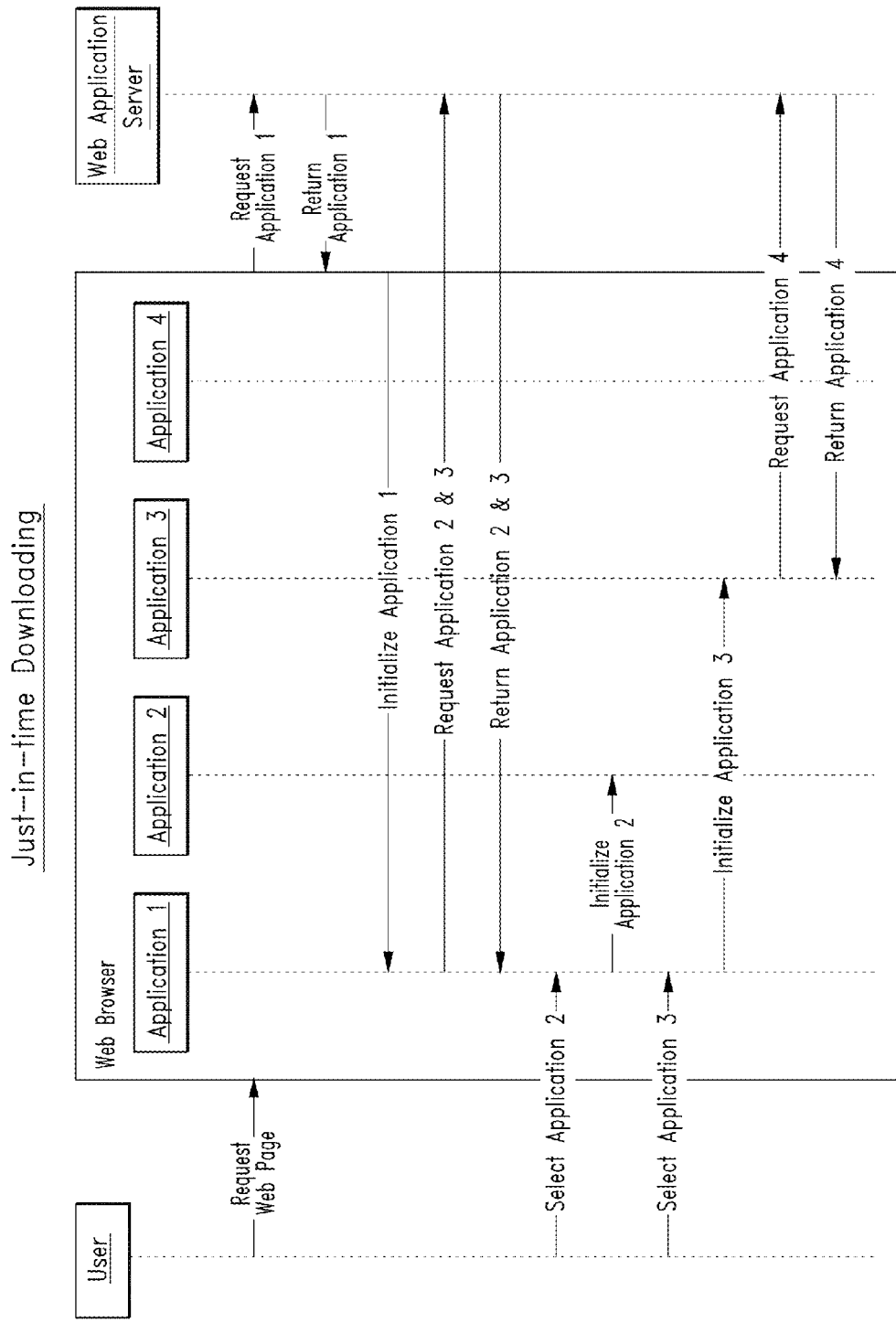
FIG. 12 illustrates the sequence of steps involved in just-in-time downloading.

FIG. 12 shows the sequence of steps involved in just-in-time downloading for the example in FIG. 11.

In FIG. 12, a User requests a particular Web Page in their Web Browser. The Web Browser fetches the Web Page and, as part of preparing the web page for display to the User, retrieves Application 1 from the Web Application Server. Then the Browser initializes Application 1, Application 2 and Application 3 are immediate children of Application 1, so Application 1 requests Application 2 and Application 3 from the Web Application Server. The just-in-time downloading for Application 1 is now complete and the Web Browser displays Application 1 to the User. The User then selects Application 2 by interacting with the Web Browser user interface. The Web Browser transmits this selection event to Application 1. Application 2 has already been downloaded, so Application 1 initializes Application 2 and displays an updated user interface to the User. The User now selects Application 3. The Web Browser transmits this selection event to Application 2. Application 3 has already been downloaded, so Application 2 initializes Application 3. Application 3 sees that it has a child application. Application 4, which has not been downloaded. Application 3 then downloads Application 4 to be prepared in case the User selects Application 4.

Data Partitioning

Data partitioning enables massive amounts of data to be broken down into manageable parts (or sub-applications). These manageable parts can be downloaded as needed by the web application using just-in-time downloading. Data partitioning combined with just-in-time downloading makes it feasible for web application users to traverse vast amounts of data in a stepped, organized, and responsive manner.

Application State

State identifiers are strings that contain all information necessary to re-create a particular application state. State identifiers can be represented in a URL, POST data, flat files, databases, etc. When a state identifier is used, inside a URL, the URL is called a stateful URL. The key element is that application state can be represented concisely and definitively. State identifiers enable state caching, lookahead or pre-caching, and social or sharing features.

State Caching

Because application state is uniquely and definitively represented in a state identifier, a web application can cache the state for a particular state identifier and not have to redundantly perform the calculations used to arrive at that state the first time it: was accessed by a user. Any rules or relationships used to specify the appropriate state for a given state identifier only need to be executed once and can then be cached, which minimizes processing and enhances performance.

Lookahead/Pre-Caching

Since states can be cached, the described application platform can also calculate the state in advance for particular states a user might access. With this technique, application states can be evaluated and cached one time on the server and leveraged by all clients/browsers that use that web application, lit this way state calculation processing can be eliminated entirely from the user browser, resulting in better application responsiveness. Web application developers can specify what kind of caching/lookahead (if any) the system should perform and to what depth.

Social/Sharing

Stateful URLs also provide a convenient mechanism for enabling web application state sharing. If a user builds a particular product configuration in a web application and wants to share it, he can do so simply by transmitting the appropriate URL to another user. Since all state is contained in a URL, web application states can also be shared via standard sharing mechanisms, like posting to Facebook™, Pinterest™, emailing, bookmarking, etc.

Application Nesting/Linking

Web applications are designed to be nested to an arbitrary depth aid also linked. The distinction between nesting and linking is one of state maintenance. The mechanism for passing state information among web applications is state identifiers. In a nested application, all state for the nested application is reflected in its parent application. In a linked application, the slate is wiped clean, and application state for the linking application does not reflect the state of the linked application. Although, the act of linking to a linked application can include transmitting the linking application's state to the linked application.

Other Features

Post Processing Directives

The declarative application language includes post processing directives that can perform general behaviors to generate the desired application state. These post processing directives can include behaviors like:
- Automatically selecting certain application objects, either based on declarative flags or certain application conditions, like the existence of only a single application object being visible/available to a user from a group of possible objects.
- Automatically adjusting the application UI in some way, like switching to a different product view in response to a user action, or changing the visible input area.

Offline Application Cache

A web application can be downloaded, cached, and subsequently run without a network connection. The HTML5 "Application Cache" feature easily enables this functionality via a manifest file.

Platform Versioning

The system is designed to allow different versions of the platform to be hosted on different domains or sub-domains, which allows staged migration to newer versions. Old versions of the platform can co-exist alongside newer versions, and application clients can choose if and when to upgrade to newer versions of the platform. Migration to a newer version can be done by simply changing a domain name.

Analytics

Analytics are built in to the platform and collect usage data for particular web applications and global data for all applications in aggregate. Having a view of aggregate analytics for all web applications served by the platform offers a better assessment of global application usage by providing more data points.

Installation Options

The platform can run as a cloud-based system with no installation requirements for application clients, run in a virtual private cloud (VPC) with configurable access via a corporate VPN and/or the Internet, or the system can be locally-installed as a standalone system inside a client network.

Security

The system can be secured via known security mechanisms like HTTP authentication/authorization, signed URLs, TLS/SSL, VPN with IPSec and other techniques.

Mobile-Ready

Using standard web technologies like HTML, CSS, and JavaScript enables web applications created by the platform to work without modification on mobile devices as well as desktop, laptop, and other conventional devices.

Figure 13:
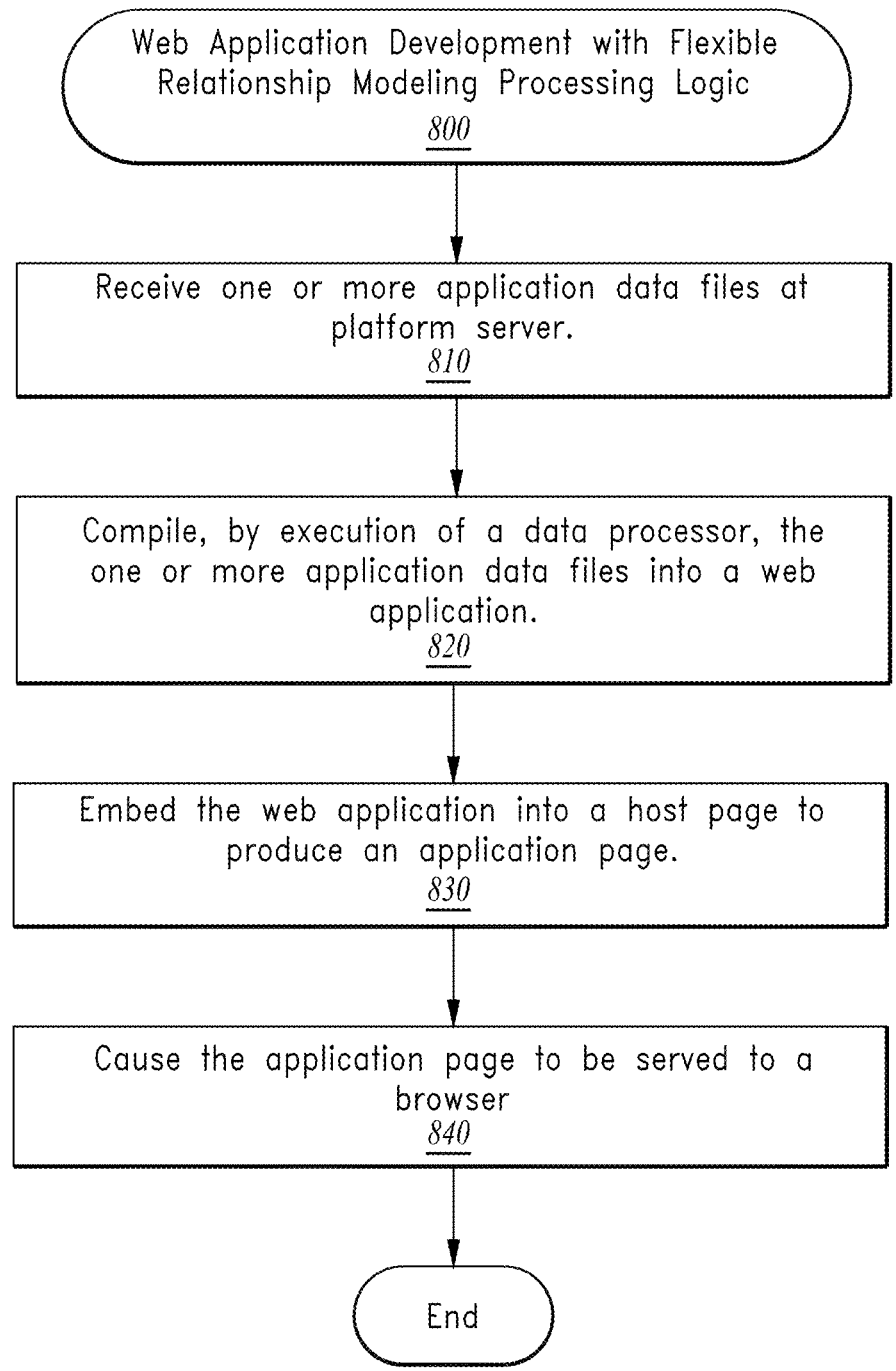
FIG. 13 is a processing flow chart illustrating an example embodiment of a method as described herein.

FIG. 13 is a processing flow chart illustrating an example embodiment of a method as described herein.

Figure 14:
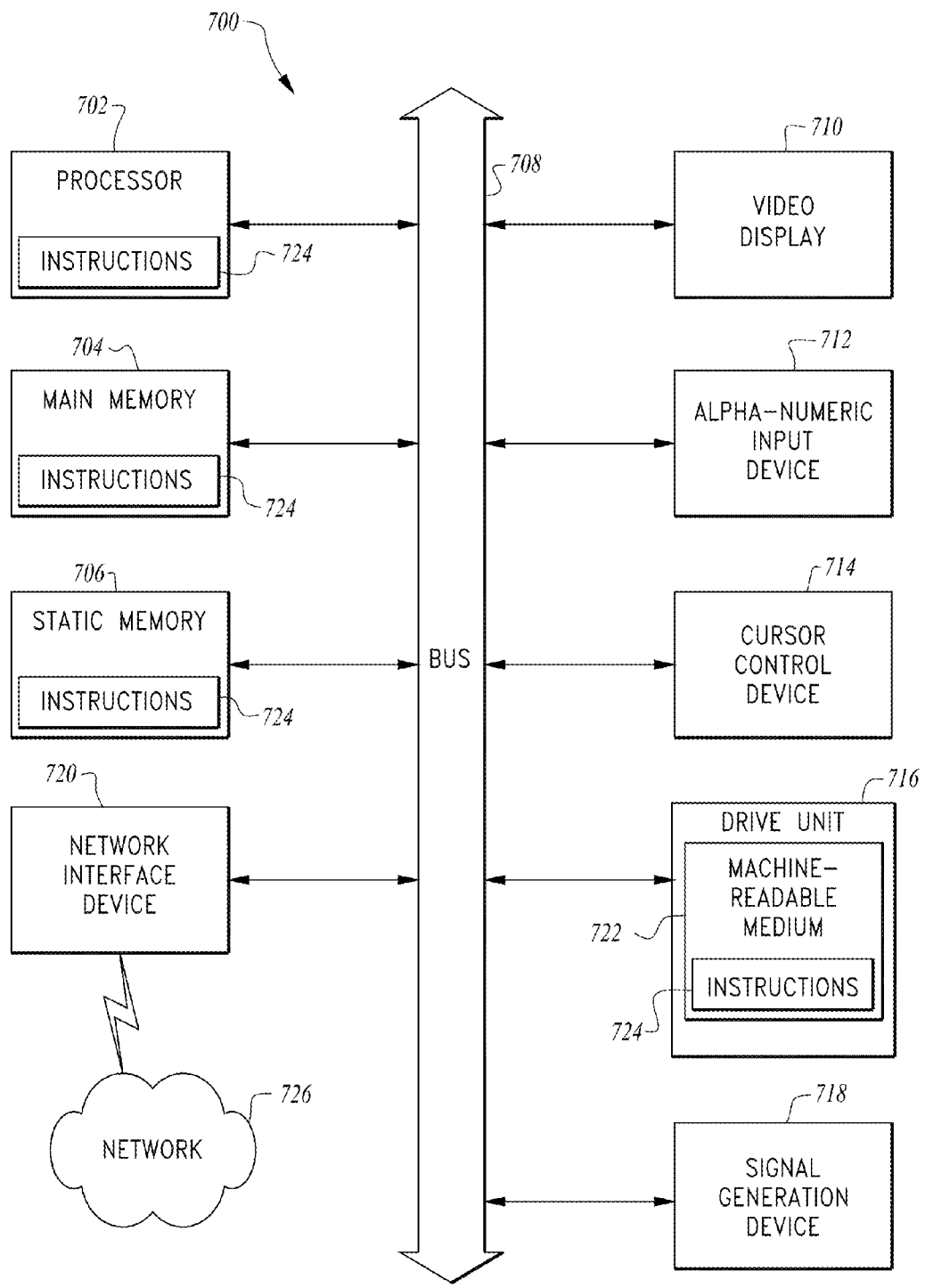
FIG. 14 shows a diagrammatic representation of machine in the example form of a computer system within which a set of instructions when executed may cause the machine to perform any one or more of the methodologies discussed herein.

FIG. 14 illustrates a diagrammatic representation of a machine in the example form of a computer system 700 within which a set of instructions when executed may cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

The example computer system 700 includes a data processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700, The main memory 704 and the processor 702 also may constitute machine-readable media. The instructions 724 may further be transmitted or received over a network 726 via the network interface device 720. While the machine-readable medium 722 is shown in an example embodiment to be a single medium, the term "machine-readable medium" should be taken to include a single non-transitory medium or multiple non-transitory media (e.g., a centralized or distributed database, and/or associated caches and servers) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

Figure 15:
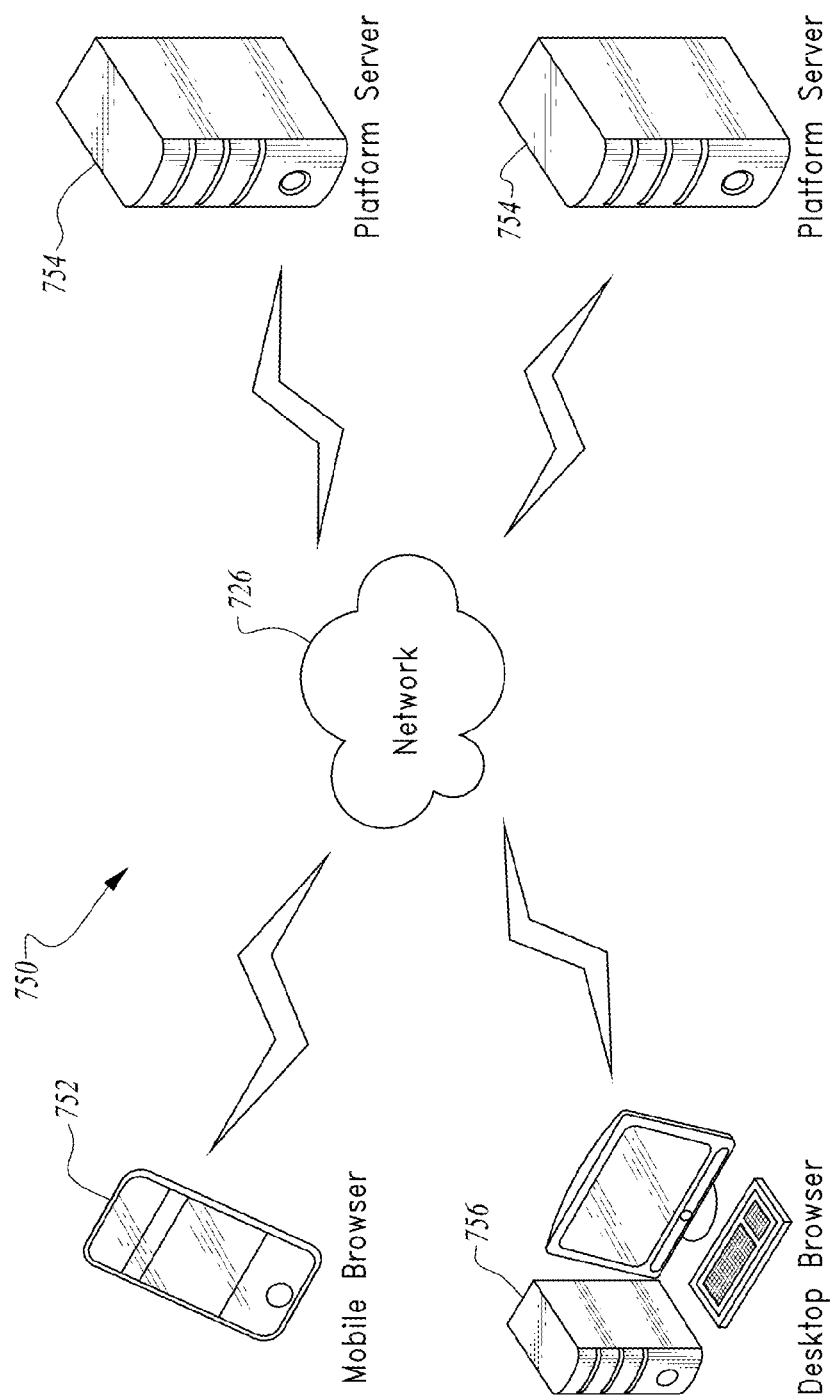
FIG. 15 illustrates a network, environment in which an example embodiment can operate.

FIG. 15 illustrates a network, environment in which an example embodiment can operate.

The Abstract of the Disclosure is provided to comply with 37 C.F.R. §1.72(b), requiring an abstract that will allow the reader to quickly ascertain the nature of the technical disclosure. It is submitted with the understanding that it will, not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method comprising:
receiving one or more base data files at a platform server;
transforming the base data files into one or more application data files, the application data files being defined in a declarative application modeling language, the declarative application modeling language comprising named data elements arranged in a hierarchical structure, the names and structure of the named data elements describing an application user interface and behavior, the declarative application modeling language including a structure for managing rules that define in part the behavior of an application, the rules comprising at least a given action and a given action trigger, the given action being automatically performed by the application upon the occurrence of the given action trigger, the given action trigger being dynamically evaluated during execution of the application and based in part on user actions, wherein the base data files are input into one or more data transformations to yield one or more application data files, each application data file describing a different application user interface and behavior corresponding to different web applications;
compiling, by execution of a data processor, each application data file into the corresponding different web applications; and
causing the web applications to be served to a browser, wherein the web application caches application states using state identifiers.

2. The method as claimed in claim 1 wherein the web application provides an Application Programming Interface (API) to enable external code to interface with web application functionality.

3. The method as claimed in claim 1 wherein base data is transformed into application data.

4. The method as claimed in claim 1 wherein multiple base datasets can be input into a single data transformation to yield multiple, different web applications.

5. The method as claimed in claim 1 wherein the web application is compiled once and then cached.

6. The method as claimed in claim 1 wherein base data is automatically generated without manual intervention via an automated process.

7. The method as claimed in claim 1 wherein the application data is automatically generated without manual intervention via an automated process.

8. The method as claimed in claim 1 wherein the web application compilation process is triggered via a single web request, either via a user click or an automated request.

9. The method as claimed in claim 1 wherein the platform server embeds the web application into a client host page by retrieving the client host page, modifying the client host page to include all necessary resources required by the web application, and serving the application web page that includes the embedded web application.

10. The method as claimed in claim 1 wherein the application web page is delivered using reverse proxy.

11. The method as claimed in claim 1 wherein the application web page is delivered using a client subdomain.

12. The method as claimed in claim 1 wherein the web application uses position-based relationship modeling to control application behavior.

13. The method as claimed in claim 1 wherein the web application uses script-based relationship modeling to control application behavior.

14. The method as claimed in claim 1 wherein the web application uses combinations of position-based and script-based relationships combined via logical connectives, including "and", "or", and "not".

15. The method as claimed in claim 1 wherein the web application uses relationships between user selections and application objects to control application behavior.

16. The method as claimed in claim 1 wherein the web application uses state identifiers to represent application state.

17. The method as claimed in claim 1 wherein the web application is partitioned into multiple sub-applications and downloads the sub-applications only when needed.

18. The method as claimed in claim 1 wherein the platform server computes and caches application states in a compiled web application.

19. The method as claimed in claim 1 wherein web application state can be shared via social, sharing mechanisms.

20. The method as claimed in claim 1 wherein web applications can be nested and/or linked.

21. The method as claimed in claim 1 wherein the web application uses post-processing directives to control application behavior.

22. The method as claimed in claim 1 wherein the web application uses an offline application cache to make the web application available to users without a network connection.

23. The method as claimed in claim 1 wherein the platform server uses versioning to enable platform upgrades with no impact to clients using previous versions of the platform.

24. The method as claimed in claim 1 wherein the platform server can be installed and executed in multiple network environments, including a cloud system, a virtual private cloud, and a private client network.

25. The method as claimed in claim 1 wherein the platform server can be secured using Hypertext Transfer Protocol (HTTP) authentication, Transport Layer Security (TLS)/Secure Sockets Layer (SSL), signed Uniform Resource Locators (URLs), Virtual Private Network (VPN), and Internet Protocol Security (IPsec).

26. The method as claimed in claim 1 wherein the web application functions correctly on mobile devices without any modifications.

\* \* \* \* \*